Figure 1:
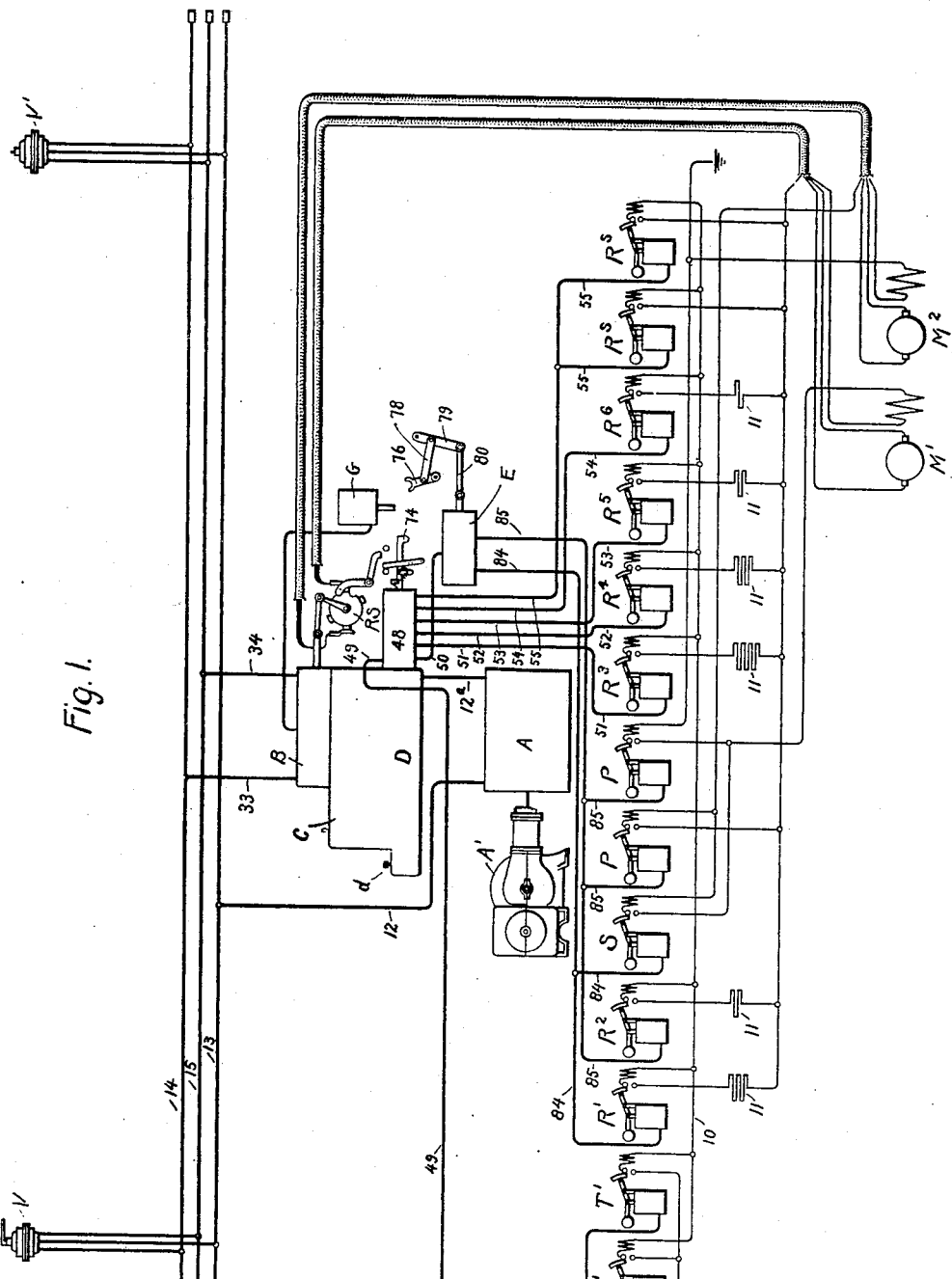

No. 763,071. PATENTED JUNE 21, 1904.
C. L. PERRY.
MOTOR CONTROL SYSTEM.
APPLICATION FILED JULY 22, 1903.
NO MODEL. 3 SHEETS—SHEET 1.

Witnesses.
J. Ellis Glenn
Helen Oxford

Inventor:
CHARLES LANGDON PERRY.
by Albert H. Lewis
Atty.

No. 763,071. PATENTED JUNE 21, 1904.
C. L. PERRY.
MOTOR CONTROL SYSTEM.
APPLICATION FILED JULY 22, 1903.
NO MODEL. 3 SHEETS—SHEET 2.
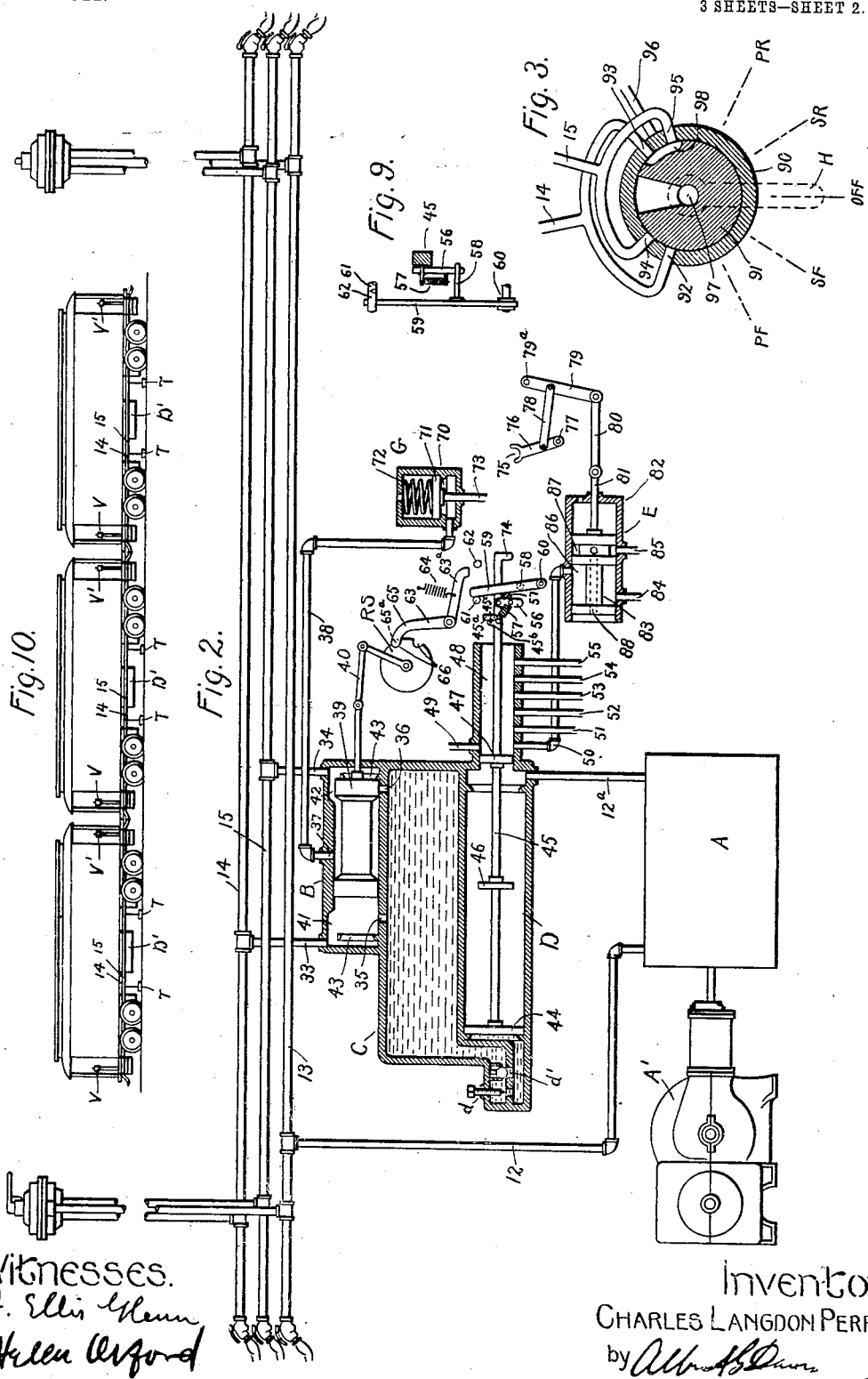
Witnesses.
J. Ellis Glenn
Helen Alford
Inventor.
CHARLES LANGDON PERRY
by Albert G. Davis
Atty.

No. 763,071. PATENTED JUNE 21, 1904.
C. L. PERRY.
MOTOR CONTROL SYSTEM.
APPLICATION FILED JULY 22, 1903.
NO MODEL. 3 SHEETS—SHEET 3.
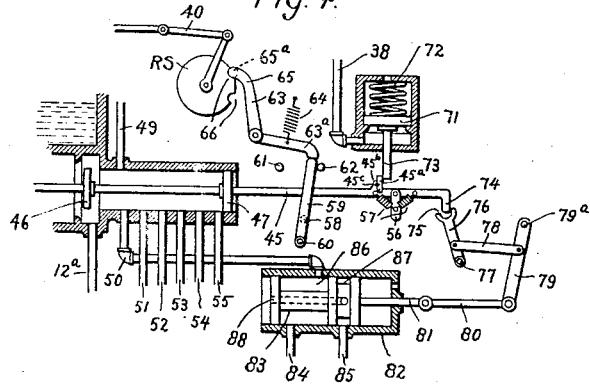
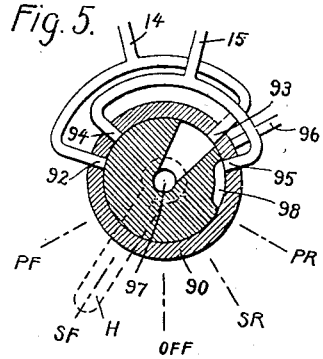
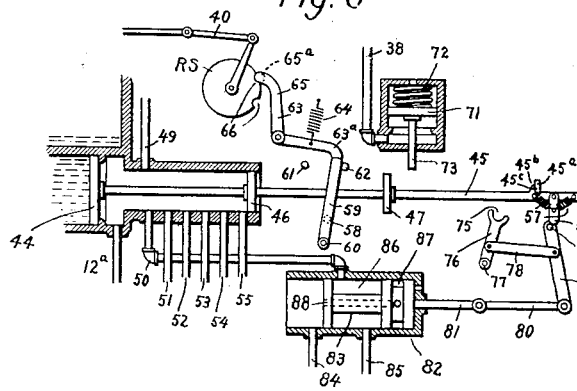
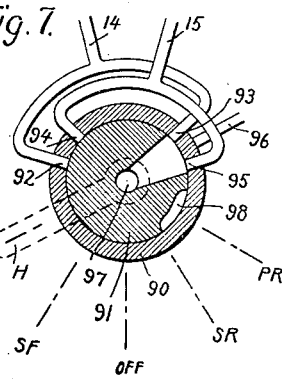
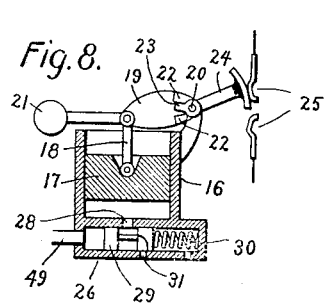
Witnesses.
Inventor.
CHARLES LANGDON PERRY
by Atty.

No. 763,071. Patented June 21, 1904.

UNITED STATES PATENT OFFICE.

CHARLES LANGDON PERRY, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 763,071, dated June 21, 1904.

Application filed July 22, 1903. Serial No. 166,577. (No model.)

*To all whom it may concern:*

Be it known that I, CHARLES LANGDON PERRY, a citizen of the United States, residing at Schenectady, county of Schenectady, State of New York, have invented certain new and useful Improvements in Motor-Control Systems, of which the following is a specification.

My present invention relates to a system of motor control employing a motor controller or controllers of the separately-actuated contact type. This system is now well known, having been set forth in many prior patents—for example, my Patent No. 687,060, dated November 19, 1901.

Ordinarily the individual contactors of the motor-controller are actuated by electromagnets in a manner similar to that shown in my patent just referred to, but in my present invention they are actuated by fluid-pressure, preferably by compressed air supplied from the air-brake reservoirs or from a special air-compressor, as may be found the most convenient.

The object of my invention is to reduce the number of train wires or pipes required and to simplify the controlling mechanism used to produce an automatic acceleration of the motors in a pneumatic system of motor control.

The present invention further relates to improvements on the system of motor control shown and described in the application of Frank E. Case, filed December 5, 1902, Serial No. 134,001. In the system disclosed in said application the controllers are illustrated as being of the ordinary cylindrical or drum type and are located on each motor-car of the train. They are operated simultaneously by pneumatically-actuated means controlled through two train-pipes by a controlling or motorman's valve located at any convenient point on the train. The compressed fluid under substantially constant pressure is admitted to one of the train-pipes, thereby operating the reversing-switches and controllers, the reversing-switches in the various cars being operated before the compressed fluid is admitted from said train-pipe to the controller-operating means. The train-pipe into which the compressed fluid is first admitted determines the position of the reversing-switches and also the direction of movement of the car or train. After the reversing-switches are moved into the desired position the controllers move forward simultaneously into the final series position, thereby producing an automatic acceleration of the motors through the series positions of the controllers. The controllers are held in the final series position by so-called "series" stops until the compressed fluid is admitted to the second train-pipe through the motorman's valve, the pressure in the first train-pipe being in the meantime maintained at its full value. The admission of the compressed fluid to the second train-pipe releases the series stop at each controller and allows the controllers to move forward into the final parallel position, thereby producing an automatic acceleration of the motors through the parallel positions of the controllers. When it is desired to allow each of the controllers to be moved back to its "off" position and stop the train, the compressed fluid is exhausted to atmosphere from both train-pipes and the controller is returned by the action of a spring. To reverse the direction of movement of the train, the compressed fluid is first admitted to the second of the train-pipes above referred to, thereby moving the reversing-switches into the reversed operative position and operating the motor-controllers as before.

In my improved system of motor control two pipes are employed, as in the Case system above referred to. The position of the reversing-switch and direction of movement of the car or train are determined as above described; but instead of operating cylindrical controllers directly I operate, by means of the compressed fluid, a contact-controlling valve, which admits compressed fluid into the cylinders of the pneumatically-actuated contacts of the motor-controller in a predetermined manner, so as to produce an automatic acceleration of the motors through series and parallel. The contact-controlling valve is held in a position corresponding to the final series position of the motor-controller by means of a series stop until released by admitting compressed fluid to the proper train-pipe, as stated above.

The invention further comprises certain detailed improvements in the construction and arrangement of parts, which will be hereinafter clearly described, and pointed out more specifically in the claims hereto appended.

In the accompanying drawings, which illustrate the preferred embodiment of my invention, Figure 1 is a diagrammatic representation of my improved pneumatic control system as applied to a single car of the train. Fig. 2 is a diagrammatic representation, on a larger scale, showing in section the mechanism for operating the reversing-switch, the contact-controlling valve, the series stop, and the series-parallel valve. Fig. 3 is a sectional plan view of the motorman's valve or master controlling-valve in the off position—that is, the position corresponding to that of the controlling mechanism shown in Fig. 2. Fig. 4 represents diagrammatically part of the controlling mechanism in its final series position. Fig. 5 is a sectional plan view of the motorman's valve in its series position, which corresponds to the position of the controlling mechanism shown in Fig. 4. Fig. 6 represents diagrammatically part of the controlling mechanism in its final parallel position. Fig. 7 is a sectional plan view of the motorman's valve in its parallel position. Fig. 8 is a vertical section through one of the pneumatically-actuated contacts of the motor-controller. Fig. 9 is an end elevation of part of the interlocking mechanism between the reversing-switch and the contact-controlling valve, and Fig. 10 shows a train of cars equipped with my improved pneumatically-actuated system of motor control.

Referring now to the diagram shown in Fig. 1, the pipes or conduits for the compressed fluid are shown by heavy black lines, while the electric conductors are shown by light lines. The motor-circuits are substantially the same as those shown and described in my prior patent, No. 687,060, to which reference has already been made. In brief, they comprise a trolley or collector-shoe T, through which current is taken from a third rail or other working conductor. The power-lead from said collector-shoe is connected to the two trolley-contacts T' T', by means of which the said power-lead is placed in connection with conductor 10, from which the current passes through suitable resistance-sections 11 and the reversing-switch RS to the motors M' and M². Provision is made for connecting the motors in series by means of the contact S or in parallel by means of the contacts P P. The remaining contacts, R' to R⁶, inclusive, and Rs Rs, control the flow of current through the resistance-sections 11.

The compressed fluid is fed from the main reservoir A through the pipe 12 into the supply train-pipe or air-brake pipe 13, from which it is supplied to the train-pipes 14 and 15, respectively, by means of one of the master controlling-valves V and V'. A substantially constant predetermined pressure is maintained in the main reservoir A by means of the electrically-driven air-compressor A'. From the train-pipes 14 and 15 the compressed fluid passes into the cylinder B and the reversing-switch RS is thrown into the desired position by mechanism which will be hereinafter described. The compressed fluid then passes into the chamber C, which contains oil or other relatively non-compressible fluid, and forces said oil through an adjustable valve $d$ into the cylinder D. The piston contained within the cylinder D is thereby moved to the right and causes the piston-valves operatively connected with said piston to uncover the ports leading from the extension 48 of cylinder D to the cylinders of the pneumatically-actuated contacts. These piston-valves are hereinafter called a "contact-controlling" valve or valves. The compressed fluid for actuating the contacts flows directly from the reservoir A through the pipe $12^a$ to the cylinder D on the opposite side of the piston from that engaged by the oil, thence into the extension 48 of said cylinder and through the conductors leading to the respective contacts and also to the series-parallel valve E, in a manner to be hereinafter described. The contact-controlling valve or valves, together with the series-parallel valve, constitute a valve mechanism which controls the acceleration of the motors through series and parallel.

Referring more particularly now to Fig. 2 of the drawings, it will be seen that the train-pipe 14 is in direct communication through the pipe 33 with one end of the cylinder B, while the train-pipe 15 is in direct communication with the other end of said cylinder B through the pipe 34. In the upper part of said cylinder B is a port 37, which communicates with a connecting-pipe 38, leading to the series stop G. The piston 39 contained within the cylinder B is adapted when in one position to open communication between the train-pipe 14 and the reservoir C through the port 35 and at the same time open communication between train-pipe 15 and the port 37 through the passage-way 42, as shown in Fig. 2. When moved from the position shown in Fig. 2 into its other operative position at the opposite end of cylinder B, the piston 39 operates the reversing-switch RS through the connecting mechanism 40 and also opens communication between the train-pipe 15 and the chamber C through the port 36 and opens communication between train-pipe 14 and the port 37 through the passage-way 41. The stops 43 are provided for the purpose of limiting the movements of the piston 39 within the cylinder B.

When the compressed fluid is admitted to the chamber C, the oil contained therein is forced into the cylinder D through the adjustable valve d, and thereby forces the piston 44 to the right. Attached to the piston 44 is a piston-rod 45, carrying the piston-valves 46 and 47, which are of smaller diameter than piston 44. These small piston-valves 46 and 47 are adapted to operate in the open-ended cylinder or casing 48, which is in reality an extension of the cylinder D, but is of a much smaller diameter. The said pistons 46 and 47 are each adapted to uncover successively the ports leading to the pipes 49, 50, 51, 52, 53, 54, and 55 to admit compressed fluid to the cylinders of the contacts T' to the series-parallel valve E and to the resistance-controlling contactors $R^3$ to $R^6$, inclusive, and Rs Rs in the order named.

Mounted on the piston-rod 45 near its outer end is a pivoted arm 56, which is maintained in a position substantially perpendicular to said piston-rod by means of the springs 57. The arm 56 is adapted to engage a pin 58, carried by the lever 59, which is pivoted at 60. The said lever 59 is limited in its movements by the stops 61 and 62. This mechanism is more clearly shown in Fig. 9. During the forward movement of the piston-rod 45 the arm 56 engages the pin 58 and throws the lever 59 against the stop-pin 62, and in its backward movement the said arm 56 operates to throw the lever 59 against the stop 61. The lever 59, when in its position against the stop-pin 62, coacts with the interlocking lever 63, so as to lock the reversing-switch RS in one or the other of its operative positions. The lever 63 is maintained in the position shown in Fig. 2 by means of the spring 64, which is attached to the arm $63^a$, the other arm, 65, being provided with an antifriction-roller $65^a$, which engages with the notches 66, formed on the movable member of the reversing-switch.

Mounted upon the extreme outer end of the piston-rod 45 is a lug 74, which is adapted to engage the recess 75, formed in the upper end of the lever-arm 76, operating about the fixed pivot 77. The lever 79, operating about the fixed pivot $79^a$, is connected to the lever-arm 76 by means of the link 78. The lever 79 is also connected by means of the link 80 to the valve-spindle 81. The said valve-spindle reciprocates in a bearing formed in one end of the cylinder or casing 82 of the series-parallel valve E. The valve 83, fastened to said spindle 81, is operated by the mechanism just described and controls the admission of compressed fluid to the pipes 84 and 85, which lead, respectively, to the cylinders of the series and parallel contacts of the motor-controller, as shown in Fig. 1, thereby determining the operation of said contacts. The cylinder or casing 82 is open at the left-hand end, so that when the valve 83 is at the right-hand end of the casing and the port leading to pipe 84 is uncovered the said pipe is exhausted to atmosphere. Two annular grooves 86 and 87 are formed on the valve 83, the groove 86 opening communication between the pipe 50 and the pipe 84 when the valve is in one position and opening communication between pipes 50 and 85 when the valve is in another position. In the position shown in Fig. 2 the pipes 50 and 84 are in communication through the annular groove 86, and the pipe 85 is connected to atmosphere through the annular groove 87 and the passage-way 88, which is formed longitudinally through the valve 83.

The series stop G comprises the cylinder 70, in which operates a piston 71, which is maintained normally at the lower end of the cylinder by means of the spring 72 and carries a stop-pin 73, which projects through a bearing in the lower end of the cylinder 70 into the path of the arm $45^a$, carried by the piston-rod 45. The said arm $45^a$ is pivoted on the rod 45 in such a manner that it will yield when engaged by the stop-pin 73 as the rod 45 moves in one direction, but will not yield as the rod moves in the opposite direction. The arm $45^a$ is normally held against the stop $45^b$ by means of the spring $45^c$.

Referring now to Fig. 3, in which I have shown the preferred construction of the master controlling or motorman's valve, 90 represents the casing of said valve, and 91 a rotatable plug mounted in said casing. The said casing 90 has formed therein the ports 92 and 93, which lead to the train-pipe 14, the ports 94 and 95, which lead to the train-pipe 15, and also an exhaust-port 96, communicating with the atmosphere. The source of compressed-fluid supply is connected through the supply train-pipe 13 to the passage-way 97, formed in the plug 91. The said plug has formed therein in addition to the passage-way 97 a groove 98, which is adapted to register with the ports 93 and 95 and also with the exhaust-port 96. The passage-way 97 is adapted to register with the ports 92, 93, 94, and 95, but not with the exhaust-port 96. The handle H of said valve is shown in dotted lines, and the positions of said handle corresponding to series forward, parallel forward, series reverse, parallel reverse, and exhaust or off are indicated by SF, PF, SR, PR, and OFF, respectively.

The construction of the pneumatically-actuated contacts of the motor-controller (one of which is shown more clearly in Fig. 8) forms no part of my present invention, since it constitutes part of the subject-matter of the patent to W. B. Potter, No. 715,291, dated December 9, 1902. In its simplest form the contact and its actuating mechanism comprise a cylinder 16, open at its upper end and containing a piston 17, connected by a short link 18 with a lever 19, which is pivoted at 20 and is provided with a weight 21, tending to keep the piston at or near the bottom of the cylinder. The lever 19 carries small lugs 22, which are adapted to strike a short arm 23 on the end of the switch-lever 24, which is also pivoted at 20, the lugs being arranged to bridge a pair of stationary contacts 25 when the piston is moved into the upper part of the cylinder. The lever 19 should have a certain amount of lost motion, so that its movement is communicated to the switch-arm 24 by a sudden blow, and thus the switch is opened and closed quickly. The portion of the switch-arm which forms the bridging contact is insulated from the remainder of the arm, as indicated in the drawings. The admission of compressed fluid to the lower end of the cylinder is governed by an automatic exhaust-valve contained in the valve-chest 26, formed integral with or otherwise attached to the cylinder. The compressed fluid enters one end of said chest through the pipe 49 and passes from thence into the cylinder through the port 28. Communication between the pipe 49 and the port 28 is normally prevented by means of the valve 29, capable of sliding longitudinally in the valve-chest and held in its normal position by a spring 30. In this position of the valve 29 there is a free communication between the cylinder and the atmosphere through the port 28, a cut-away portion of the body of the valve, and an exhaust-port 31 in the valve-chest; but when the compressed fluid is admitted through pipe 49 the valve is forced backward against the action of spring 30 and the exhaust-port is closed. As soon as the valve passes the port 28 the compressed fluid can enter the cylinder and lift the piston to cause the switch to close, the exhaust-port 31 being meanwhile closed by the valve 29. When the fluid-pressure is reduced in the pipe 49, the spring restores the valve to its normal position and by opening the exhaust-port permits the fluid under the piston to escape quickly.

In Fig. 10 I have shown a train of cars equipped with my improved motor control. The positions of the master controlling-valves on each car are indicated by V and V'. The position of the motor-controller and the contact-controlling valve is indicated by D'. The relative locations of the train-pipes 14 and 15 and of the trolley T are also shown in this figure.

The operation of my improved system of motor control will now be described. We will assume that the master controlling-valve is in the position shown in Fig. 3—that is, in its off position. The reversing-switch RS, the series-parallel valve, the contact-controlling valve, the series stop, and the actuating mechanism therefor are in the position shown in Fig. 2. If now the master controlling-valve is moved into its series forward position, as shown in Fig. 5, the compressed fluid is admitted from the supply train-pipe 13 through the passage-way 97 and port 93 into the train-pipe 14. The compressed fluid then passes from the train-pipe 14 through the pipe 33 into the left-hand end of the cylinder B and from thence into the chamber C through port 35. The oil in said chamber C is therefore forced through the adjustable valve $d$ into the cylinder D and moves the piston 44 forward to the right. The forward movement of said piston causes the arm 56 to engage the pin 58 on the lever 59 and throw said lever against the pin 62, thus locking the reversing-switch and its actuating-piston in the position shown in Fig. 2. The locking of the reversing-switch is accomplished when the upper end of the lever 59 is moved under the arm $63^a$ of the locking-lever 63, thereby preventing the antifriction-roller $65^a$ from leaving the grooves or recess 66 on the reversing-switch with which it is in engagement. The continued forward movement of said piston 44 causes piston-valve 47 to uncover the port leading to pipe 49, thus allowing the compressed fluid to pass from the cylinder D into the cylinder 48 and from thence through pipe 49 into the lower end of the cylinder 16 of the trolley-contacts T' T', thereby closing said contacts. During this forward movement of the piston-rod 45 the pivoted arm 56, due to its spring-mounting, will slide over the pin 58 after the lever 59 has been moved against the stop 62. A further forward movement of the piston 44 causes the piston 47 to open communication between the source of compressed-fluid supply and the pipe 50, leading to the series-parallel switch E. The compressed fluid passes through said pipe 50 and around the annular groove 86 into the pipe 84, which, as shown in the diagram Fig. 1, leads to the cylinders of the contacts R' and S, thereby operating said contacts to connect the motors in series and complete the motor-circuit through the first section of resistance 11. The further forward movement of the piston 44 causes the piston-valve 47 to uncover successively the ports leading to the pipes 51, 52, 53, 54, and 55, respectively, thereby admitting compressed fluid to the cylinders of the contacts $R^3$ $R^4$ $R^5$ $R^6$ and R$s$ R$s$, respectively. When the contacts R$s$ are operated, all the resistance-sections 11 of the motor-circuit are short-circuited and the motor-controller is in its final series position. The piston 44 is held in the position corresponding to the final series position of the motor-controller by means of the series stop G, the pin 73 of which engages with the pivoted arm $45^a$. The position of the actuating mechanism corresponding to the final series position of the motor-controller is clearly illustrated in Fig. 4. If now the motorman's valve be moved into its parallel forward position, as indicated in Fig. 7, so that the passage-way 97 will register with both of the ports 93 and 95 and the groove 98 will be out of register with any of the ports in the valve-casing, the compressed fluid will be admitted to the train-pipe 15, while at the same time the pressure will be maintained in the train-pipe 14. The compressed fluid will then pass from train-pipe 15 through the pipe 34 into the right-hand end of cylinder B, thence through the passage-way 42, formed in the upper part of said cylinder, and the port 37 into the pipe 38, from which it passes into the lower end of the cylinder 70 of the series stop G. The piston 71 in said cylinder is thereby moved upward against the action of the spring 72, and the stop-pin 73 is released from engagement with the pivoted arm $45^a$, thus allowing the piston 44 to move forward again under the pressure maintained in train-pipe 14. On account of the interlock between the reversing-switch and the contact-controlling valve the piston 39 will not move away from the position shown in Fig. 2 when the compressed fluid is admitted to the right-hand end of the cylinder B from train-pipe 15. Immediately after the pivoted arm $45^a$ is released by the series stop the piston 44 will again move forward, the small piston-valve 47 passing out of the right-hand open end of the cylinder 48 just after the small piston-valve 46 enters the left-hand end of said cylinder. It will thus be seen that communication between the source of compressed-fluid supply and cylinder 48 is cut off by the piston-valve 46 and all of the pipes connected to the cylinder 48 are exhausted to atmosphere through the right-hand open end of said cylinder, thus causing all the contacts of the motor-controller to open. As the piston 44 moves forward from this position the lug 74 engages the slot 75 in the upper end of the lever-arm 76, thus forcing the lever 79, and consequently the series-parallel valve E, into the position shown in Fig. 6. A further forward movement of piston 44 causes the piston-valve 46 to uncover the port leading to the pipe 49, thereby permitting compressed fluid to pass from the source of supply A through the pipe 49 into the cylinders of the contacts T' T', closing said contacts again. The piston-valve 46 then uncovers the port leading to the pipe 50, and the compressed fluid therefore passes into the cylinder 82 of the series-parallel valve, thence by way of the annular groove 86 into the pipe 85, it being understood that the valve 83 has been moved into the right-hand end of the cylinder 82, as shown in Fig. 6. The contacts $R^2$ and P P will therefore be operated to connect the motors in parallel and complete the power-circuit through said motors. As the piston continues its forward movement the piston-valve 46 successively uncovers the ports leading to pipes 51 to 55, inclusive, and causes the contacts $R^3$ to $R^6$, inclusive, and also the contacts $R^s$ $R^s$ to operate in the order named. The motor-controller is now in its final parallel position with the different parts of the contact-controlling mechanism in the position shown in Fig. 6 and the motorman's valve in the position shown in Fig. 7. If it is now desired to stop the train, the motorman's valve is moved back into the position shown in Fig. 3, thereby closing the communication between the source of compressed-fluid supply and the train-pipes and opening communication between said train-pipes and the atmosphere through the ports 93 and 95 and the exhaust-port 96. When said train-pipes are exhausted to atmosphere, the compressed fluid in the cylinder D, which, it will be remembered, is in direct communication with the reservoir A, acts upon the right-hand side of the piston 44 to force it backward into the position shown in Fig. 2, thereby driving the oil contained in the cylinder D on the left-hand side of the piston 44 back through the check-valve $d'$ and adjustable valve $d$ into the reservoir C. The check-valve $d'$ is provided with a large opening, so that the oil may be forced rapidly into the reservoir C and allow the piston 44 to move quickly back to its "initial" or off position. It will be clearly understood that such reverse movement of the piston 44 will naturally take place when the pressure is withdrawn from the surface of the oil in the chamber C, since the pressure of the compressed fluid acting upon the larger area of the piston 44 is more than sufficient to overcome the pressure of said compressed fluid acting upon the small piston-valves 46 and 47. As the contact-controlling valve moves toward its off position the contacts of the motor-controller are opened in the reverse order to that in which they are closed during the forward movement of said valve, but much more rapidly. The rapidity of the reverse movement depends upon the size of the ports in the valves $d$ and $d'$. When the pressure is released from the train-pipes, the series-stop pin 73 falls into the path of the pivoted arm $45^a$; but since said lug is pivoted to the piston-rod 45, as above described, the pin will slide over the said pivoted arm and will not act to retard the backward movement of the piston 44. The lug 74 engages the lever-arm 76 and returns the series-parallel valve to its series position during the transition period between the parallel and series operation of the motor-controller contacts as determined by the valves 46 and 47. Also during the backward movement of said piston 44 the pivoted arm 56 will again engage pin 58, carried by the lever 59, releasing said arm from engagement with the locking-lever 63 and forcing it up against the stop-pin 61, after which said arm 56 will slide over the pin 58 and will assume the position shown in Fig. 2.

When it is desired to operate the car or train in the reverse direction, the master controlling-valve is moved into its series reverse position, thus bringing the port 94 into engagement with the passage-way 97 and admitting compressed fluid to the train-pipe 15. The compressed fluid then flows from the train-pipe 15 through the pipe 34 into the right-hand end of the cylinder B, forcing the piston 39, contained therein, to the left. The reversing-switch RS is thereby thrown into its reverse position through the agency of the connecting means 40. In this position of piston 39 the train-pipe 15 is connected to the reservoir C through the port 36 and the train-pipe 14 is connected to the port 37 through the pipe 33 and the passage-way 41 and the port 35 is closed by the piston 39. The compressed fluid enters the reservoir C, forces the oil contained therein into the cylinder D, and thereby moves the contact-controlling valve forward to produce the automatic acceleration of the motors through the series positions.

To operate the controlling mechanism so that the motors will be connected in parallel for reverse direction of movement, the master controlling-valve is rotated into its parallel reverse position, thereby bringing the passage-way 97 into register with the port 92, the port 94 being in the meantime maintained in register with said passage-way 97. The admission of compressed fluid to the train-pipe 14, which follows the movement of the master controlling-valve, as just described, causes the series stop G to release the contact-controlling valve, and thereby allows the contacts of the motor-controller to be operated to produce automatic acceleration of the motors in parallel. The operation of the remainder of the controlling mechanism is the same as before described. To stop the train when the reversing-switch is in its reverse position, the master controlling-valve is moved into the position shown in Fig. 3, the train-pipes are exhausted, and the backward movement of the controlling mechanism toward its off position takes place as above described.

The operation of but one motor-controller actuating and controlling mechanism on the train has been described; but it will be clearly understood that the corresponding parts of the various actuating and controlling mechanisms throughout the train are moved simultaneously in response to the desired movement of the master controlling-valve.

The compressed fluid for operating this system of control may be drawn from the air-brake system or may be supplied by a special fluid-compressor, as desired.

In the appended claims I aim to cover all modifications which do not involve a departure from the spirit and scope of my invention.

What I claim as new, and desire to secure by Letters Patent of the United States, is—

1. In combination, a motor or motors, a motor-controller made up of a plurality of separate pneumatically-actuated contacts, and means for controlling the successive admission of compressed fluid to the actuating means for said contacts so as to produce an automatic acceleration of said motor or motors.

2. In combination, a motor or motors, a motor-controller made up of a plurality of separate pneumatically-actuated contacts, a valve or valves for controlling the successive admission of compressed fluid to the actuating means for said contacts, and means for operating said valve or valves so as to produce an automatic acceleration of the motor or motors.

3. In combination, a motor or motors, a motor-controller made up of a plurality of separate pneumatically-actuated contacts, a valve or valves for controlling the successive admission of compressed fluid to the actuating means for said contacts, pneumatically-actuated means for operating said valve or valves so as to produce an automatic acceleration of the motor or motors, and a master controlling-valve located at any desired point for admitting the compressed fluid to said valve-operating means.

4. In combination, a plurality of motors, a plurality of separate pneumatically-actuated contacts for grouping the motors in series or in parallel relationship, a series-parallel valve for determining the operation of said contacts, and pneumatically-actuated means operatively connected to said series-parallel valve for actuating the same.

5. In combination, a plurality of motors, a plurality of separate pneumatically-actuated contacts for grouping the motors in series or in parallel relationship, a series-parallel valve for determining the operation of said contacts, pneumatically-actuated means operatively connected to said series-parallel valve for operating the same, and a master controlling-valve for controlling the operation of said pneumatically-actuated means.

6. In combination, a plurality of motors, a motor-controller comprising a plurality of separate pneumatically-actuated contacts for grouping the motors in series or in parallel relationship and for changing the resistance of the motor-circuits, a series-parallel valve for determining the operation of said series and parallel contacts, a contact-controlling valve or valves for controlling the admission of compressed fluid to the contacts of the motor-controller, and pneumatically-actuated means operatively connected to said series-parallel valve and said contact-controlling valve for operating the same.

7. In combination, a plurality of motors, a motor-controller comprising a plurality of separate pneumatically-actuated contacts for grouping the motors in series or in parallel relationship and for changing the resistance of the motor-circuits, a series-parallel valve for determining the operation of said series and parallel contacts, a contact-controlling valve or valves for controlling the admission of compressed fluid to the contacts of the motor-controller, pneumatically-actuated means operatively connected to said series-parallel valve and said contact-controlling valve for operating the same, and a master controlling-valve for controlling the operation of said pneumatically-actuated valve-operating means.

8. In a system of train control, the combination with a plurality of motor-cars coupled together to form a train, of a plurality of separate pneumatically-actuated contacts mounted on each car for changing the resistance of the motor-circuits of said car, pneumatically-actuated means also mounted on each car for controlling the successive operation of the pneumatically-actuated contacts on that car, and a master controlling-valve located at any desired point on the train for controlling the simultaneous admission of compressed fluid to all of said pneumatically-actuated controlling means.

9. In a system of train control, the combination with a plurality of motors mounted on the cars of the train, of a plurality of separate pneumatically-actuated contacts mounted on each car for controlling the motors on that car, a contact-controlling valve on each car adapted to admit compressed fluid to the contacts, pneumatically-actuated means carried by each car operatively connected to said contact-controlling valve and adapted to actuate the same so as to produce an automatic acceleration of the motors on that car, and a master controlling-valve located at any desired point on the train for controlling the simultaneous admission of compressed fluid to the pneumatically-actuated means throughout the train.

10. In a controller for electric motors, the combination with a plurality of separate pneumatically-actuated contacts for varying the motor speed, of a single pipe charged with compressed fluid at substantially a constant pressure, and means connected with said pipe for automatically controlling the successive operation of said contacts.

11. In a train-control system, a plurality of motors, a plurality of motor-controllers having separate pneumatically-actuated contacts for varying the motor speed, a single train-pipe, a source of compressed-fluid supply, means for controlling the admission of compressed fluid to said train-pipe at substantially a constant pressure, and means connected with said train-pipe for automatically controlling the successive operation of the contacts of each motor-controller.

12. In combination, a motor or motors, a motor-controller having separate pneumatically-actuated contacts, means actuated by fluid-pressure for controlling the successive operation of said contacts, a source of compressed-fluid supply, and means for admitting compressed fluid to said fluid-pressure-actuated means at substantially a constant pressure whereby said contacts are operated to produce an automatic acceleration of the motor or motors.

13. In a controller for electric motors, the combination with a plurality of separate pneumatically-actuated contacts for varying the motor speed and for grouping the motors in series or in parallel relationship, pneumatically-actuated means for producing the successive operation of said speed-varying contacts and also for operating the series-parallel contacts, a source of compressed-fluid supply, and means for controlling the admission of compressed fluid at substantially a constant pressure to said pneumatically-actuated means so as to produce an automatic acceleration of the motors.

14. In a motor-control system, a plurality of motors, a plurality of motor-controllers having separate pneumatically-actuated contacts for varying the motor speed and for grouping the motors in series or in parallel relationship, pneumatically-actuated means for controlling the operation of said contacts, two train-pipes operatively connected with said pneumatically-actuated means, a source of compressed-fluid supply, and means for admitting compressed fluid to said train-pipes to operate said pneumatically-actuated means to produce an automatic acceleration of the motors in series and in parallel.

15. In a motor-control system, a plurality of motors, a motor-controller having separate pneumatically-actuated contacts for varying the motor speed and for grouping the motors in series or in parallel relationship, pneumatically-actuated means for controlling the operation of said contacts, two train-pipes operatively connected with said pneumatically-actuated means, a source of compressed-fluid supply, means for admitting compressed fluid to said train-pipes to operate said pneumatically-actuated means to produce an automatic acceleration of the motors in series and in parallel, and a pneumatically-actuated series stop also connected with said train-pipes for arresting said pneumatically-actuated means in a position corresponding to the final series position of the motor-controller.

16. In combination, a motor-controller comprising a plurality of separately-actuated contacts, fluid-pressure devices for operating the several contacts, a pipe system comprising a number of pipes less than the number of contacts to be operated, and means operated through the said pipe system for controlling the supply of compressed fluid to the several fluid-pressure devices.

17. In combination, a plurality of motor-controllers, each comprising a plurality of separately-actuated contacts, fluid-pressure means for actuating the several contacts, a train-pipe system comprising a number of pipes less than the number of contacts of each motor-controller, and means operated through said train-pipe system for controlling the supply of compressed fluid to the several fluid-pressure devices.

18. In combination, a motor-controller comprising a plurality of separately-actuated contacts, fluid-pressure devices for operating the several contacts, means for controlling the supply of compressed fluid to said fluid-pressure devices, a plurality of pipes connected to said controlling means the number of said pipes being less than the number of fluid-pressure devices of the motor-controller, and means for controlling the admission of compressed fluid to said pipes.

19. In combination, a plurality of controllers each comprising a plurality of separately-actuated contacts, fluid-pressure devices for operating the several contacts, means for controlling the supply of compressed fluid to said fluid-pressure devices, a train-pipe system connected with said controlling means, comprising a number of pipes less than the number of the fluid-pressure devices in each motor-controller, and means for controlling the admission of compressed fluid to said train-pipe system.

20. In a motor-control system, a plurality of pneumatically-actuated contacts forming a motor-controller, a source of compressed-fluid supply, a cylinder or casing connected with said source of supply and with the actuating devices for said contacts, a valve in said casing which controls the successive operation of said contacts, and means for moving said valve forward at a uniform rate of speed to operate said contacts successively and produce an automatic acceleration of the motor or motors.

21. In a motor-control system, a plurality of pneumatically-actuated contacts forming a motor-controller, a source of compressed-fluid supply, a cylinder or casing connected with said source of supply and with the actuating devices for said contacts, a valve in said casing which controls the successive operation of said contacts, means for moving said valve forward at a uniform rate of speed to operate said contacts successively and produce an automatic acceleration of the motor or motors, and means for changing the rate of speed with which the valve moves forward whereby any desired rate of acceleration may be produced.

22. In a motor-control system a plurality of pneumatically-actuated contacts forming a motor-controller, a source of compressed-fluid supply, a cylinder or casing connected with said source of supply and with the means for actuating said contacts, a valve adapted to operate in said casing to control the operation of said contacts through acceleration in series, a second valve adapted to operate in said casing to control the operation of said contacts through acceleration in parallel, and means for actuating said valves.

23. In a motor-control system, a plurality of pneumatically-actuated contacts forming a motor-controller, a source of compressed-fluid supply, a cylinder or casing connected with said source of supply and with the means for actuating said contacts, a valve adapted to operate in said casing to control the operation of said contacts through acceleration in series, a second valve adapted to operate in said casing to control the operation of said contacts through acceleration in parallel, and means whereby said valves are moved forward through their operative positions and returned to their initial or "off" positions by the action of compressed fluid.

24. In a motor-control system, a plurality of pneumatically-actuated contacts forming a motor-controller, a source of compressed-fluid supply, a cylinder or casing connected with said source of supply and with the means for actuating said contacts, a valve adapted to operate in said casing to control the operation of said contacts through acceleration in series, a second valve for controlling the operation of said contacts through acceleration in parallel, means for actuating said valves, a series-parallel valve, and means whereby said series-parallel valve is operated after the first-mentioned valve has been moved through its operative positions.

25. In a motor-control system, a plurality of pneumatically-actuated contacts forming a motor-controller, a source of compressed-fluid supply, a cylinder or casing connected with said source of supply and with the means for actuating said contacts, a valve adapted to operate in said casing to control the operation of said contacts through acceleration in series, a second valve for controlling the operation of said contacts through acceleration in parallel, pneumatically-actuated means for operating said valves, a series-parallel valve, and means operatively connected with said pneumatically actuated means whereby said series-parallel-valve is operated after the first-mentioned valve has been moved through its operative positions.

26. In a system of motor control, a motor or motors, means actuated by fluid-pressure for controlling said motor or motors, a plurality of pipes connected with said controlling means, a source of compressed-fluid supply, and a valve adapted when moved through one part of its range of movement to admit the compressed fluid from said source of supply to said pipes in a certain order to produce forward movement of the motors and when moved through another part of its range of movement to admit the compressed fluid to said pipes in a reversed order to produce a reverse movement of the motors.

27. In a pneumatic system of motor control, a plurality of pipes, a source of compressed-fluid supply, a controlling-valve for admitting compressed fluid to said pipes in a certain order when moved through part of its range of movement, for admitting the compressed fluid to said pipes in a reversed order when moved through a second part of its range of movement, and for exhausting said pipes to atmosphere when moved into a third part of its range of movement.

28. In a motor-control system, a controller made up of a plurality of pneumatically-actuated contacts, a pneumatically-actuated valve for controlling the successive operation of said contacts, a reversing-switch, pneumatically-actuated means for operating said reversing-switch, two pipes operatively connected to said pneumatically-actuated valve and reversing-switch-actuating means, means for admitting compressed fluid to one of said pipes to operate said reversing-switch and to move said valve forward through the positions corresponding to the series position of the motor-controller and also for admitting compressed fluid to both of said pipes to cause said valve to move forward through the positions corresponding to the parallel positions of the motor-controller.

29. In a motor-control system, a motor-controller having a plurality of separate pneumatically-actuated contacts, a pneumatically-actuated contact-controlling valve, a reversing-switch, and means for preventing the movement of said reversing-switch while the contact-controlling valve is in any position other than that corresponding to the "off" position of the motor-controller.

30. In combination, a motor-controller comprising separately-actuated resistance and series-parallel contacts, fluid-pressure devices for operating the several contacts, and a valve mechanism constructed and arranged to supply during its movement forward through its operative positions compressed fluid to operate first the contacts which control the series connections, then the resistance-varying contacts successively, then to exhaust the fluid-pressure devices and release all of the contacts thus operated, then to supply compressed fluid to operate the contacts which control the parallel connections, and finally to supply compressed fluid to again actuate the resistance-varying contacts in succession.

31. In combination, a motor-controller comprising separately-actuated resistance and series-parallel contacts, fluid-pressure devices for operating the several contacts, a valve mechanism constructed and arranged to supply compressed fluid to operate first the contacts which control the series connections, then the resistance-varying contacts successively, then to exhaust the fluid-pressure devices and release all of the contacts thus operated, then to supply compressed fluid to operate the contacts which control the parallel connections and finally to supply compressed fluid to again actuate the resistance-varying contacts in succession, means for actuating said valve mechanism, and means for controlling the operation of the actuating means for said valve mechanism from any desired point.

32. In combination, a motor-controller comprising separately-actuated resistance and series-parallel contacts, fluid-pressure devices for operating the several contacts, a valve mechanism constructed and arranged to supply compressed fluid to operate first the contacts which control the series connections and thereafter to operate the resistance-varying contacts successively, then to exhaust the fluid-pressure devices and release all of the contacts thus operated, then to supply compressed fluid to operate the contacts which control the parallel connections and finally to supply compressed fluid to again actuate the resistance-varying contacts in succession, means actuated by fluid-pressure for operating said valve mechanism, and a master controlling-valve for controlling the admission of compressed fluid to the operating means for said valve mechanism.

33. In a control system, a contact-controlling valve, a reversing-switch, and pneumatically-actuated means for operating said reversing-switch and for controlling the application of pressure to said valve.

34. In a system of control, a plurality of separately-actuated contacts, a device for controlling the successive operation of said contacts, pneumatic means for operating said device, and means for controlling said operating means from a distance.

35. In a system of control, a plurality of separately-actuated contacts, a device for controlling the successive operation of said contacts, pneumatic means for operating said device, a stop for arresting said device at a predetermined point in its travel, and means for controlling said stop and the operating means for said controlling device from a distance.

36. In a system of control, a plurality of separately-actuated contacts, a device for controlling the successive operation of said contacts, pneumatic means for operating said device, a reversing-switch, and pneumatically-actuated means for operating said reversing-switch and for controlling the connections to the operating means for said controlling device.

In witness whereof I have hereunto set my hand this 20th day of July, 1903.

CHARLES LANGDON PERRY.

Witnesses:
BENJAMIN B. HULL,
HELEN ORFORD.